No. 861,262. PATENTED JULY 30, 1907.
P. J. CHANAVAS.
WHISK BROOM.
APPLICATION FILED SEPT. 20, 1906.
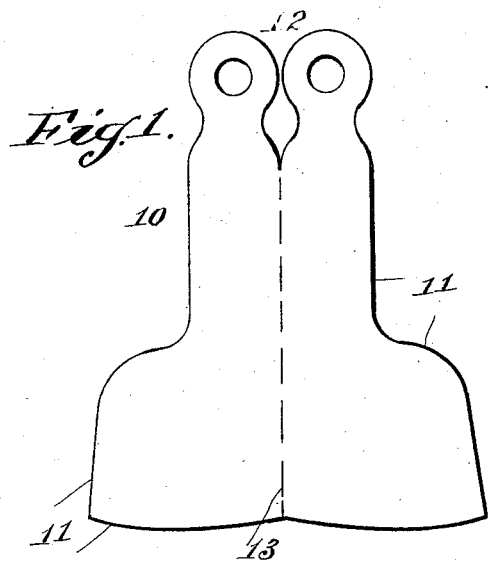
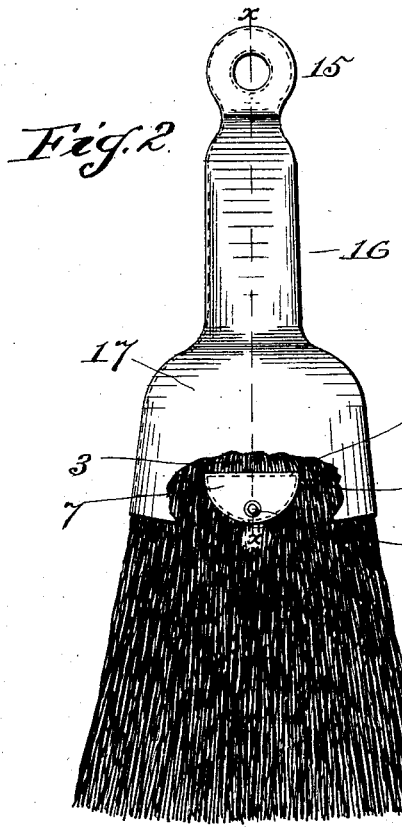
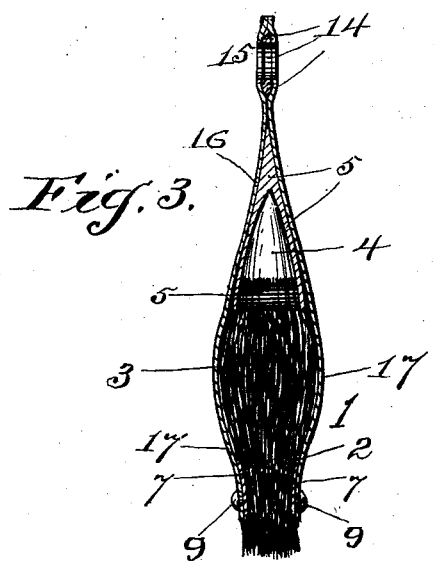
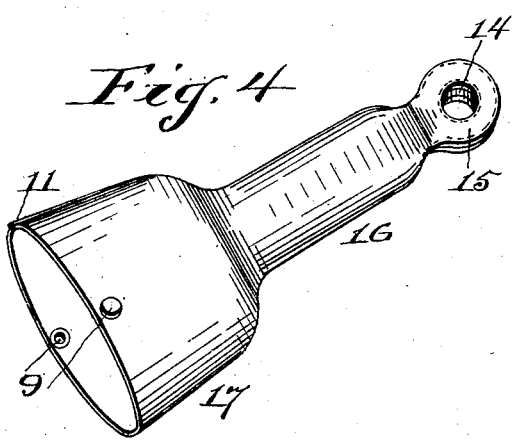
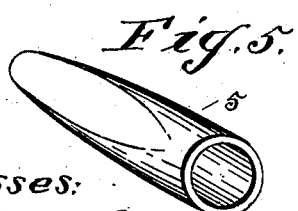
Witnesses:
W. E. Vack Jr.
W. F. Crossman
Inventor.
Paul J. Chanavas
By C. F. Belt
Attorney.

UNITED STATES PATENT OFFICE.

PAUL J. CHANAVAS, OF NEW YORK, N. Y.

WHISK-BROOM.

No. 861,262.  Specification of Letters Patent.  Patented July 30, 1907.

Application filed September 20, 1906. Serial No. 335,385.

*To all whom it may concern:*

Be it known that I, PAUL J. CHANAVAS, a citizen of the United States, residing at New York, in the county of New York, and State of New York, have invented certain new and useful Improvements in Whisk-Brooms, of which the following is a specification.

This invention relates to whisk brooms and especially to the class of such brooms having detachable handles and protecting shields.

The object of the invention is to provide a whisk broom having the male member of a clasp secured thereto on each side thereof and adapted to coact with the female member of the clasp carried on each side of a handle casing to connect and disconnect the handle and the broom.

A further object of the invention is to provide a whisk broom handle and broom head cover or casing adapted to inclose the broom-head stub without being attached thereto, and to cover the broom-head and be detachably buttoned to the broom below said head.

A still further object of the invention is to provide a stock of peculiar shape for holding the stub or straw ends of a whisk broom, and to provide a handle having a suspending loop or ring in one and the same piece, a broom-head cover in the same piece with the handle, and means carried by the broom and the cover to detachably hold the handle and the cover to the broom.

It is obvious that in this class of devices the purpose is to furnish a handle and broom-head cover or protector capable of being transferred from a worn out or defective broom to a new one, thereby extending the use of a handle to several or many brooms. Within the knowledge of applicant the perpetuating handle idea has heretofore been confined to securing a supplemental handle to the usual broom handle by a suspending ring having a screw extending through the supplemental handle into the broom handle, or to securing the halves of a broom-head shield together and to a broom by means of bolts or screws extending through the broom and through said halves. It is therefore the purpose of this invention to furnish a combined handle, suspending ring or loop and a shield or casing adapted to be connected and disconnected with a broom-stub and broom-head respectively, and to furnish novel means carried below the broom-head for making said connection and disconnection.

In the accompanying drawings forming part of this application:—Figure 1 is a plan view of a form prepared for molding; Fig. 2 is an elevation, partly broken away, of a whisk broom showing the application of the invention; Fig. 3 is a longitudinal section taken on the line *x—x*, Fig. 2; Fig. 4 is a detail perspective view of the handle and shield; and Fig. 5 is a detail perspective view of the socket or stock.

The same reference numerals denote the same parts throughout the several views of the drawings.

The broom 1 is of the usual shape and straw construction, having a single row of stitching 2, a head 3 from which projects the straw ends wired to the headstem 4, and forming a stub. A socket or stock 5, hollow at one end, fits over and is glued or otherwise suitably secured to the stub, and is tapered or flattened from its hollow end to its other end. To each side of the broom just below the head 3 is secured by stitches 6 a tab 7, each of said tabs having the male member 8 of a button clasp secured thereto. While these tabs are shown attached to a manufactured broom, they may be attached in the manufacture of brooms by the broom seams.

The combined handle, suspending ring and head shield or cover are preferably shaped or molded in one and the same piece of sole leather (preferably), but the same may be made in halves or two parts adapted to be secured together, and may be composed of other suitable material. The blank or form 10 from which this device is molded has its edges 11 approximately shaped, and its top 12 cut in two ring-shaped projections. The form is adapted to be bent or folded on the line 13, so as to make the ring-shaped projections rest one upon the other, and when the form is molded and pressed into desired shape, the edges 11 and the ring-shaped projections are stitched together with a stiffening 14 between said projections. In this manner is formed the suspending ring 15, the handle 16, and the shield 17. Each side of the shield 17 is provided with the female member 9 of the button clasps.

It will be seen that the handle 16 tapers from a circular shape at its juncture with the shield to a flat end where it merges into the suspending ring; that the said handle and the shield fit over the broom socket or stock and the broom-head respectively without being attached thereto; that after being slid into position it is only necessary to operate the clasps to fasten and release the handle and the shield; and that the juncture of the ring and handle is such as to render the ring bendable at this point in suspending the broom.

It is obvious that the device may be suitably ornamented, that other equivalent means for clasping it to a broom may be employed, and that the shape, size and material thereof may be varied as desired or as occasion may demand without departing from the spirit of the invention.

Having thus described my invention, what I claim as new and desire to secure by Letters Patent is:—

1. An attachment for whisk brooms, comprising a handle, a suspending ring formed therein and projecting therefrom, a shield extending from the handle, and means for detachably connecting the handle, ring and shield to the broom adjacent the broom-head.

2. An attachment for whisk brooms, comprising an integral shield, handle and suspending ring, and means carried by the shield and the broom for detachably connecting the shield to the broom.

3. The combination, with a whisk broom, and suitable clasps, of a shield adapted to be detachably held to the broom by the clasps, a handle integral with and projecting from the shield, and a suspending ring integral with and projecting from the handle.

4. In a whisk broom having a stub, the combination of a stock or socket having a flattened portion fitting the stub, a handle fitting the socket and having a cover or shield for the broom head, and suitable means carried by the shield and the broom head for detachably connecting the handle to the socket.

In witness whereof I hereunto set my hand in the presence of two witnesses.

PAUL J. CHANAVAS.

Witnesses:
 WILLIAM KNIGHT,
 ARTHUR J. BENDIX.